United States Patent Office 2,855,808
Patented Oct. 14, 1958

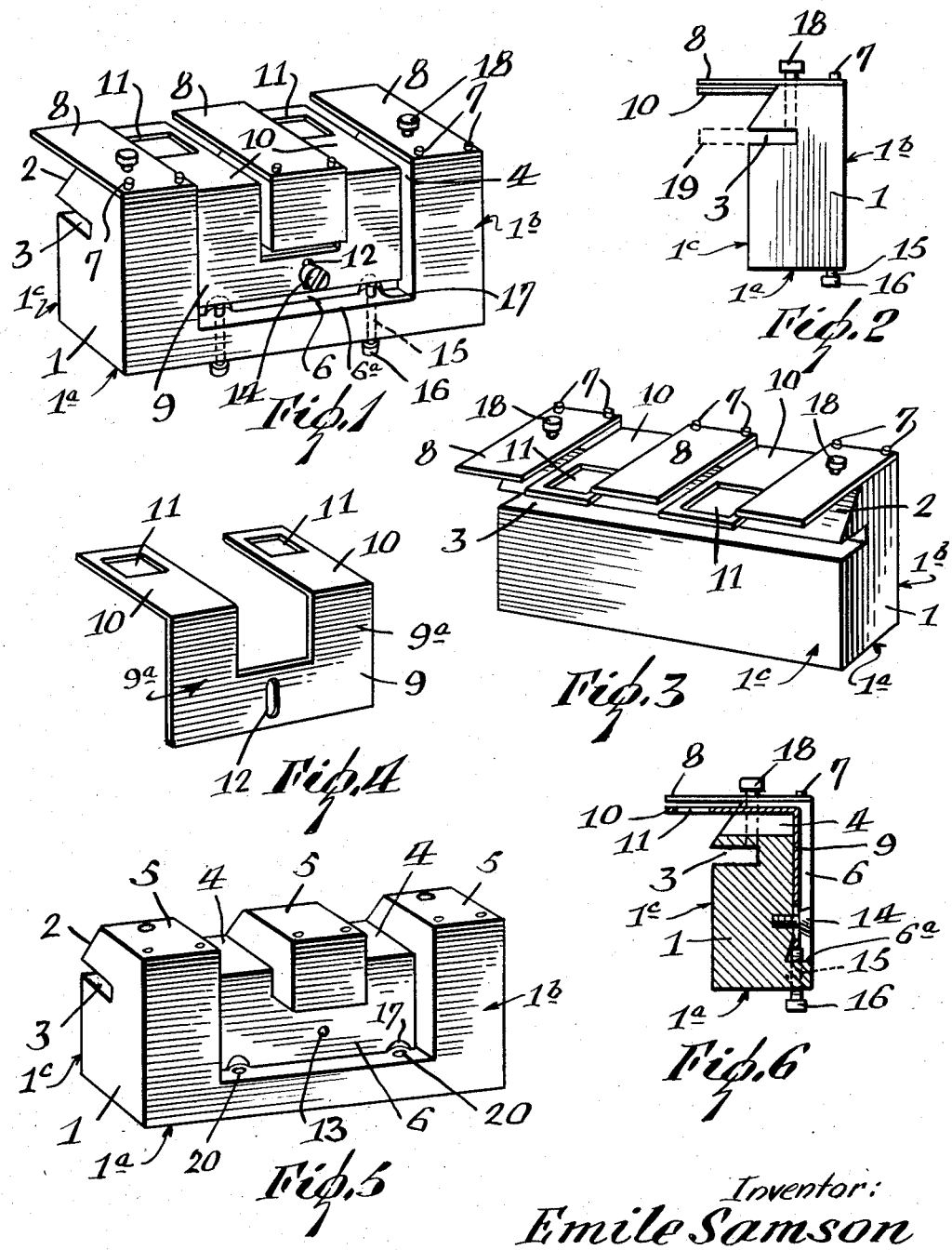

2,855,808

RAKER GAGE FOR CHAIN SAWS

Emile Samson, St.-Prosper, Quebec, Canada

Application December 24, 1956, Serial No. 630,256

1 Claim. (Cl. 76—36)

This invention relates to a tooth gage and evener for chain saws, and especially for chain saws having cutter teeth and raker teeth.

After a chain saw has been used for some time, the teeth, particularly the cutter teeth, become dull and in so doing wear off the points unequally and thus become of different heights. The ordinary process of filing such teeth for sharpening does not ensure that the cutter teeth along the saw are brought to a uniform height, so that there is no uniformity of action of the several teeth on the material being sawn.

One important object of this invention is to provide a novel tooth gage which, when moved along the cutting edge of a chain saw, will disclose any inequalities in tooth height between the several teeth.

Even when such tooth inequalities are discovered, it is difficult, by the usual filing methods, to bring the several teeth to uniformity of height.

It is a second important object of this invention to provide filing means associated with the tooth gage whereby movement of this device along the saw effects restoration of the teeth to uniformity of height.

A third important object of this invention is to provide a novel device of this character, the use of which facilitates more frequent filing of the saw, so that it is enabled to cut at all times with great smoothness, thus avoiding vibration of the chain with consequent breakage, and lessens the wear on the chain motor and the bearings and pulleys carrying the chain.

A fourth important object of this invention is to provide a device of this novel character which will not interfere with the lateral setting of the saw teeth.

A fifth important object of the invention is to provide a novel device affording all of the above mentioned advantages without interfering with the filing of the raker teeth of such a saw.

With the above and other objects in view, as will be presently apparent, the invention consists in general of certain novel features of construction and combinations of parts hereinafter fully described, illustrated in the accompanying drawings, and particularly claimed.

In the accompanying drawings, like characters of reference indicate like parts in the several views; and Figure 1 is a perspective view of the device taken from its rear face, and is completely assembled for tooth gaging, the associated file being omitted;

Figure 2 is an end elevation of the assembly as shown in Figure 1, the position of a tooth evening file being disclosed;

Figure 3 is a perspective view of the assembly shown in Figure 1, but disclosing the front of the device;

Figure 4 is a perspective view of an adjustable gage plate forming part of this invention;

Figure 5 is a detail perspective view of the body of the device, taken from the same side as Figure 1; and Figure 6 is a transverse section taken at the center.

The body of this device is indicated in general at 1. This body has a horizontal unbroken base 1a and a vertical rear face 1b. The lower part of the front face of the body is vertical as at 1c, while the upper part 2 of the front face is bevelled rearwardly, and, extending from end to end of the body at the junction of the face portions 1c and 2, is a slot 3. Extending transversely of the top of the body is a pair of spaced slots 4 which serve to divide the upper face of the body into three top face portions 5 which lie in the same horizontal plane. The rear face 1b is provided with a recess 6, the bottom of which is located in upwardly spaced relation to the base 1a, as shown at 6a, and the recess extends upwardly at each end to meet the slots 4.

On each of the top face portions 5 is mounted a flat plate 8, the rear end of which is flush with the rear face 1b of the body 1, being secured by screws 7 to the body. The forward ends of the plates 8 overhang the bevelled portion 2 and terminate well forwardly of the vertical plane 1c of the body.

As shown in Figure 4, there is provided gage plates or angle plates 9 having a vertical lower portion resting in the lower part of the recess 6, and these plates 9 are provided at each end with an upstanding leg portion 9a, from the upper end of which extends horizontal arms 10 which fit in the slots 4 at a lower level than the plates 8. These arms 10 provide tooth point engaging means and are provided with openings 11 through which raker teeth may project for filing. The gage plate 9 is provided with a vertical slot 12 through which passes a screw 14 engaging in a hole 13 to hold the gage plate to the body 12 and to aid in securing the gage plate in adjusted position. Extending upwardly from the bottom of the lock to the end portions of the recess 6 is a pair of threaded holes 20 which open upwardly in recesses 17 which lie below the lower edge of the portion 9a of the gage plate 9. Through the holes 20 extend screws 15 which engage the lower edge of the gage plate and are provided with heads 16. Thus by loosening the screw 14 slightly, the screws 15 may be used for vertical adjustment and levelling of the gage plates, after which the screw 14 may be tightened and thus hold the gage plates securely in adjustment. To even off the cutter teeth, a file 19 may be temporarily held in slot 3 by screws 18 passing downwardly through plates 7 and the upper part of the body 1.

In the use of the invention, the tips of all the teeth of the saw (except raker teeth, which are shorter) are levelled by sliding file 19 over them while said file is held in block 1. Vertical side face 1c of block 1 serves as a guide by sliding it along the side of the saw. This levelling is necessary to form a base for filing the raker teeth, as often some teeth are broken and jagged. When the levelling operation is done on the saw long teeth, file 19 is removed from slot 3, and then plates 8 are set on the shortened teeth in a position so the raker teeth enter holes 11 of lower surface 10. The sharpening file is then slid transversely of the body in slots 4 over surfaces 10 serving as guides, and the raker teeth (not shown) are filed to proper level.

There has been provided a simple and efficient device of the kind described and for the purpose specified.

What I claim is:

In a device of the kind described, a body member having a rear face, a recess formed in said rear face, a double angle rear plate having a vertical lower portion resting in the lower part of said recess, threaded holes which open upwardly in said recess, set screws in said holes, a vertical slot in said rear plate, a set screw passing through said vertical slot and engaging a hole in said recess, horizontal arms on said rear plate, openings formed through said arms, said body member having upper and front faces, a pair of spaced slots dividing said upper face of said body, said arms being placed in said slots, and flat plates secured by screws to the three top surfaces on each side of said spaced slots, and a bevel angle formed at the upper part of said front face of said body.

References Cited in the file of this patent

UNITED STATES PATENTS

| | | |
|---|---|---|
| 672,691 | Anderson | Apr. 23, 1901 |
| 789,560 | Olsen | May 9, 1905 |
| 976,956 | Wakley | Nov. 29, 1910 |
| 1,770,324 | Ross | July 8, 1930 |
| 2,438,687 | Stone | Mar. 30, 1948 |
| 2,682,791 | Lahaie | July 6, 1954 |